US011226739B2

United States Patent
Zhao et al.

(10) Patent No.: US 11,226,739 B2
(45) Date of Patent: Jan. 18, 2022

(54) METHOD, DEVICE AND COMPUTER PROGRAM PRODUCT FOR STORAGE MANAGEMENT

(71) Applicant: EMC IP Holding Company LLC, Hopkinton, MA (US)

(72) Inventors: Jingrong Zhao, Chengdu (CN); Qingxiao Zheng, Chengdu (CN); Kerry Li, Chengdu (CN); Yi Wang, Chengdu (CN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 23 days.

(21) Appl. No.: 16/588,993

(22) Filed: Sep. 30, 2019

(65) Prior Publication Data

US 2020/0341648 A1    Oct. 29, 2020

(30) Foreign Application Priority Data

Apr. 25, 2019   (CN) .......................... 201910338805.X

(51) Int. Cl.
*G06F 3/06* (2006.01)
*G06F 9/50* (2006.01)

(52) U.S. Cl.
CPC .......... *G06F 3/0608* (2013.01); *G06F 3/0644* (2013.01); *G06F 3/0646* (2013.01); *G06F 3/0673* (2013.01); *G06F 9/5022* (2013.01); *G06F 2209/503* (2013.01)

(58) Field of Classification Search
CPC .... G06F 3/0608; G06F 3/0644; G06F 3/0673; G06F 9/5022; G06F 2209/503

USPC .......................................................... 711/154
See application file for complete search history.

(56) References Cited

U.S. PATENT DOCUMENTS

| | | | | |
|---|---|---|---|---|
| 5,579,507 A | * | 11/1996 | Hosouchi | G06F 12/08 711/117 |
| 6,834,290 B1 | * | 12/2004 | Pugh | G06F 16/2282 707/803 |
| 9,830,111 B1 | * | 11/2017 | Patiejunas | G06F 3/0689 |
| 2008/0052331 A1 | * | 2/2008 | Ogawa | G06F 3/0605 |
| 2011/0320709 A1 | * | 12/2011 | Han | G06F 3/0617 711/114 |
| 2012/0265961 A1 | * | 10/2012 | Mine | G06F 3/0685 711/171 |
| 2013/0086345 A1 | * | 4/2013 | Endoh | G06F 11/1448 711/162 |

(Continued)

*Primary Examiner* — Christopher B Shin
(74) *Attorney, Agent, or Firm* — Womble Bond Dickinson (US) LLP

(57) ABSTRACT

Embodiments of the present disclosure a method, device and computer program product for storage management. The method comprises: determining, from a storage system, a plurality of storage areas corresponding to a plurality of files; selecting, from the plurality of storage areas, a pair of first storage area and second storage area, both the first storage area and the second storage area having non-empty available space; moving at least part of data stored in used space of the first storage area to available space of the second storage area; and in response to determining that the used space of the first storage area becomes empty after the moving, releasing the first storage area. In this way, the storage space can be effectively released and the storage efficiency is accordingly improved.

20 Claims, 4 Drawing Sheets

(56) References Cited

U.S. PATENT DOCUMENTS

2018/0025022 A1* 1/2018 Van Riel ............... G06F 16/185
                                                    707/620
2019/0056883 A1* 2/2019 Kim ..................... G06F 12/128

* cited by examiner

METHOD, DEVICE AND COMPUTER PROGRAM PRODUCT FOR STORAGE MANAGEMENT

CROSS-REFERENCE TO RELATED APPLICATION

This patent application claims priority, under 35 U.S.C. § 119, of Chinese Patent Application No. 201910338805.X, filed Apr. 25, 2019, entitled "METHOD, DEVICE AND COMPUTER PROGRAM PRODUCT FOR STORAGE MANAGEMENT," which is incorporated by reference herein its entirety.

FIELD

Embodiments of the present disclosure generally relate to the computer field, and more specifically, to a method, a device and a computer program product for storage management.

BACKGROUND

In recent years, the safety of data storage has attracted more and more attention with the development of the computer technology. Data backup also gradually becomes a common technique to guarantee safety of data. In the conventional data backup, redundant data backup is typically avoided by means like hash table etc. The scale of data that need to be backed up also grows with time. Therefore, how to effectively manage the backed-up data has become the focus of attention.

SUMMARY

Embodiments of the present disclosure provide a solution for storage management.

In accordance with a first aspect of the present disclosure, there is provided a method for storage management. The method comprises: determining, from a storage system, a plurality of storage areas corresponding to a plurality of files; selecting, from the plurality of storage areas, a pair of first storage area and second storage area, both the first storage area and the second storage area having non-empty available space; moving at least part of data stored in used space of the first storage area to available space of the second storage area; and in response to determining that the used space of the first storage area becomes empty after the moving, releasing the first storage area.

In accordance with a second aspect of the present disclosure, there is provided a device for storage management. The device comprises: at least one processing unit; and at least one memory being coupled to the at least one processing unit and storing instructions for execution by the at least one processing unit, the instructions, when executed by the at least one processing unit, causing the device to perform acts comprising: determining, from a storage system, a plurality of storage areas corresponding to a plurality of files; selecting, from the plurality of storage areas, a pair of first storage area and second storage area, both the first storage area and the second storage area having non-empty available space; moving at least part of data stored in used space of the first storage area to available space of the second storage area; and in response to determining that the used space of the first storage area becomes empty after the moving, releasing the first storage area.

In accordance with a third aspect, there is provided a computer program product. The computer program product stored in a non-transitory computer storage medium and comprises machine-executable instructions which, when executed by a device, cause the device to perform any steps of the method according to the first aspect of the present disclosure.

This Summary is provided to introduce a selection of concepts in a simplified form that are further described below in the Detailed Description. This Summary is not intended to identify key features or essential features of the present disclosure, nor is it intended to be used to limit the scope of the present disclosure.

BRIEF DESCRIPTION OF THE DRAWINGS

The above and other objectives, features, and advantages of example embodiments of the present disclosure will become more apparent from the following detailed description with reference to the accompanying drawings, in which the same reference symbols refer to the same elements in exemplary embodiments of the present disclosure.

DETAILED DESCRIPTION OF EMBODIMENTS

Figure 1:
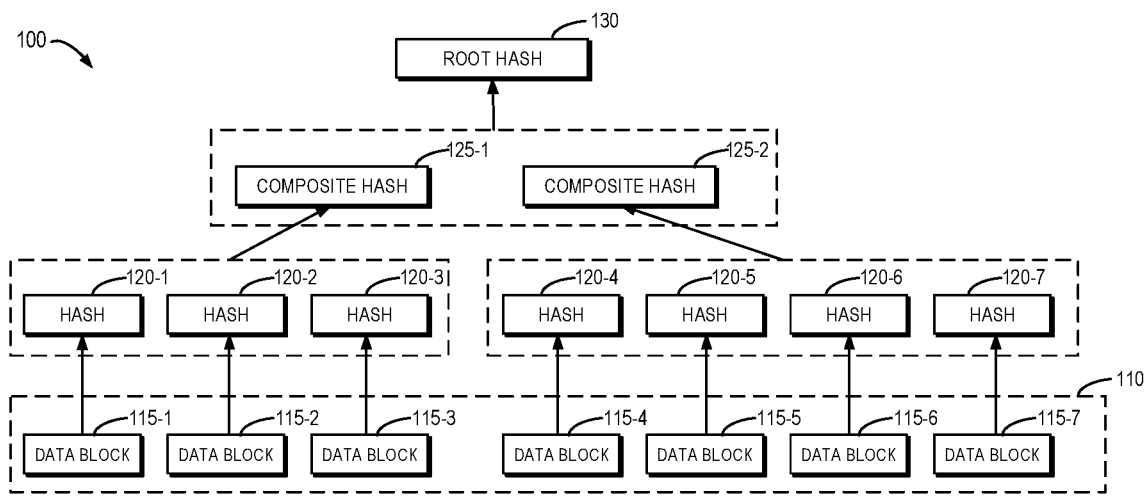
FIG. 1 illustrates a schematic diagram of hash-based data backup in accordance with embodiments of the present disclosure.

Preferred embodiments of the present disclosure will be described as follows in greater detail with reference to the drawings. Although preferred embodiments of the present disclosure are illustrated in the drawings, it is to be understood that the present disclosure described herein may be implemented in various manners, not limited to the embodiments illustrated herein. Rather, these embodiments are provided to make the present disclosure described herein clearer and more complete and convey the scope of the present disclosure described herein completely to those skilled in the art.

As used herein, the term "includes" and its variants are to be read as open-ended terms that mean "includes, but is not limited to." The term "or" is to be read as "and/or" unless the context clearly indicates otherwise. The term "based on" is to be read as "based at least in part on." The term "one example implementation" and "an example implementation" are to be read as "at least one example implementation." The term "another implementation" is to be read as "at least one other implementation." Terms "a first", "a second"

and others may denote different or identical objects. The following text may also contain other explicit or implicit definitions.

As described above, hash tables are usually used to prevent redundant data backup during the process of data backup. FIG. 1 illustrates a schematic diagram 100 of hash-based data backup in accordance with embodiments of the present disclosure. According to FIG. 1, in some backup systems, backup data 110 can be sliced into a plurality of data chunks 115-1 to 115-7 (individually or collectively known as data chunk 115). Hashes corresponding to these data chunks can be calculated, i.e., hashes 120-1 to 120-7 ((individually or collectively known as hash 120). Moreover, a hash operation is further performed on hashes 120-1, 120-2 and 120-3 to obtain a composite hash 125-1, and a hash is implemented on hashes 120-4, 120-5, 120-6 and 120-7 to obtain a composite hash 125-2. A root hash 130 corresponding to the backup data 110 can be further obtained from the composite hashes 125-1 and 125-2. During data backup, the backup system can calculate a hash value of the data and compare the hash value with stored hash values to determine whether the data has been backed up, so as to prevent redundant data backup.

In accordance with some data backup solutions, in order to store the data chunks as continuous as possible for increasing read efficiency, the backup system can allocate a file of a fixed size in the storage device in advance for backing up data. To enhance the efficiency of writing the backup data during the backup process, instead of choosing a free area from the data file for storage, the new data will be directly added into the data file in sequence when backing up.

Figure 2:
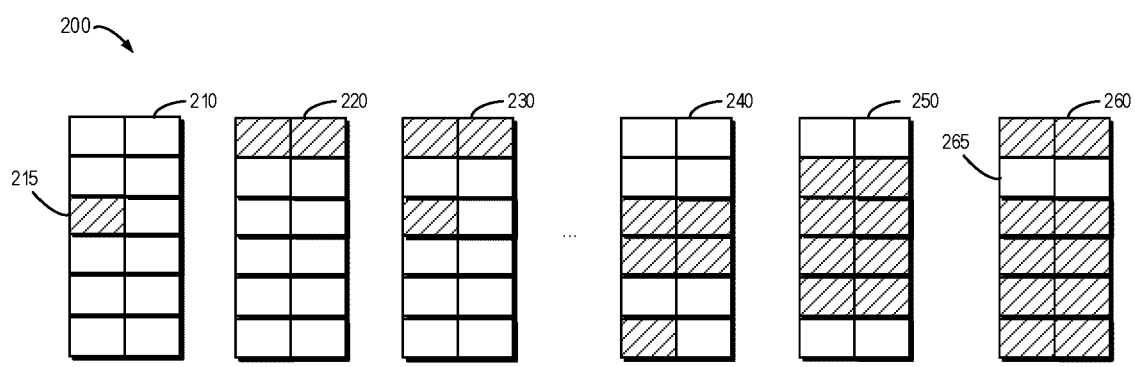
FIG. 2 illustrates a schematic diagram of a plurality of example storage areas in accordance with embodiments of the present disclosure.

However, some backup data may expire or be deleted. Besides, some maintenance programs (e.g., garbage collection) may also reclaim storage spaces corresponding to some data chunks in the data file. FIG. 2 illustrates a schematic diagram 200 of a plurality of example storage areas in accordance with embodiments of the present disclosure. As shown in FIG. 2, a plurality of storage areas 210, 220, 230, 240, 250 and 260 are included in the example of FIG. 2. These storage areas correspond to respective backup files.

According to FIG. 2, blocks indicated by left slash represent storage chunks (e.g., storage chunk 215) still in use and unfilled blocks represent the storage chunks (e.g., storage chunk 264) not in use due to deletion and expiration. During backup, the backup system always writes the backup data into the rear of the backup file instead of writing into unused available spaces of the existing backup file. Besides, some storage chunks (e.g., storage chunk 265) may be released for some reasons and then become available. Accordingly, as shown in FIG. 2, storage areas (such as storage area 210) corresponding to some backup files only have few storage chunks not in use, which results into a huge waste of storage space. The wasted storage space increases as the scale of the backup data grows. It should be understood that a plurality of storage areas and distribution of their available storage chunks indicated in FIG. 2 are only exemplary and are not intended for limiting the present disclosure. In addition, in the upgrade process of the backup system architecture, the available space in the original storage space cannot be used for the upgraded backup system architecture because of inconsistency of file storage format.

In accordance with embodiments of the present disclosure, there is provided a storage management solution. In this solution, a plurality of storage areas corresponding to a plurality of files are first determined in the storage system and a pair of a first storage area and a second storage area are selected from the plurality of storage areas, wherein both the first storage area and the second storage area have non-empty available spaces. Subsequently, at least part of data stored in the used space of the first storage area are moved to an available space of the second storage area, and when the used space of the first storage area becomes empty after the movement, the first storage area is released. In this way, embodiments of the present disclosure can reorganize the existing plurality of storage areas and remove useless data files by moving the data, thereby releasing the corresponding storage areas and accordingly enhancing efficiency of data storage.

Figure 3:
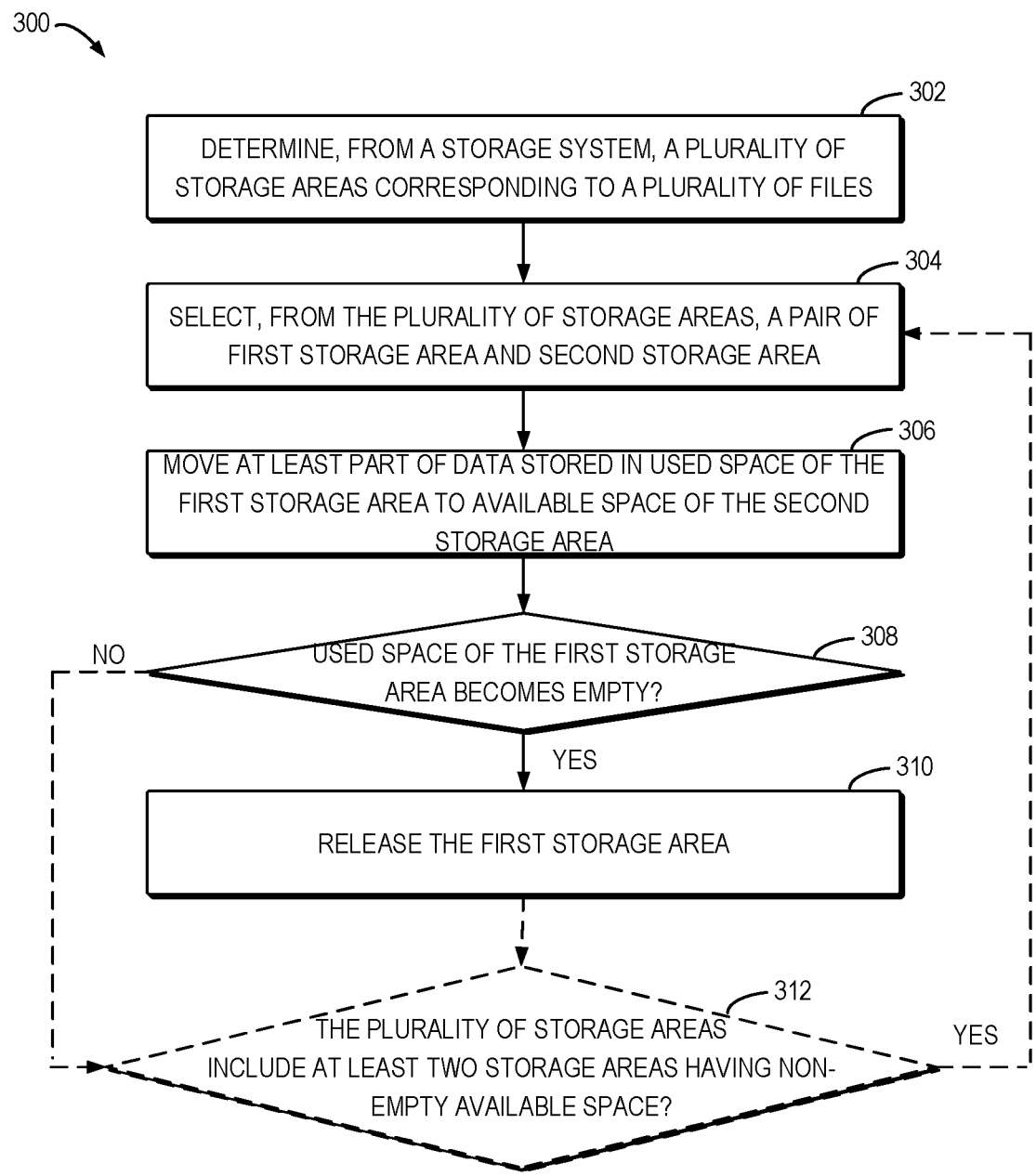
FIG. 3 illustrates a flowchart of a process of storage management in accordance with some embodiments of the present disclosure.

A process of storage management in accordance with embodiments of the present disclosure is described below with reference to FIG. 3 to FIG. 5. FIG. 3 illustrates a flowchart of a process 300 of storage management in accordance with some embodiments of the present disclosure. The process 300 can be implemented by the backup system. For example, the process 300 can start in response to an artificial request or can be automatically initiated when the backup system determines that a majority of backup data are deleted or expired. For the sake of discussion, the process 300 of storage management is described below with reference to the example of FIG. 2.

At block 302, the backup system determines, from the storage system, a plurality of storage areas corresponding to a plurality of files. In some embodiments, a plurality of files are backup files and the backup system can determine, by traversing all data backup files in the storage system, a plurality of storage areas corresponding to all of the data backup files. For example, the plurality of storage areas determined are storage areas 210, 220, 230, 240, 250 and 260 in FIG. 2.

At block 304, the backup system selects, from the plurality of storage areas, a pair of a first storage area and a second storage area. Both the first storage area and the second storage area have non-empty available spaces. Continue to refer to the example of FIG. 2. In some embodiments, the backup system can randomly select, from the non-empty available spaces, the first storage area and the second storage area, wherein a size of the available space in the first storage area is greater than a size of the available space in the second storage area.

In some embodiments, in order to improve the efficiency for reorganizing the data, the backup system can sort the plurality of storage areas by size of available space in a descending order. As demonstrated by the example of FIG. 2, the storage area 210 to the storage area 260 is sorted by the size of the available space in a descending order. Furthermore, the backup system can select a storage area having maximum available space as the first storage area, and select a storage area having minimum and non-empty available space as the second storage area. In the example of FIG. 2, the backup system, for example, can determine the storage area 210 (having 11 available storage chunks) as the first storage area and the storage area 260 (having 2 available storage chunks) as the second storage area.

At block 306, the backup system moves at least part of data stored in the used space of the first storage area to the available space of the second storage area. In some embodiments, the backup system can move at least one used data chunk in the first storage area from the first storage area to the second storage area. For example, continuing to refer to the example of FIG. 2, the backup system can move the data in the used data chunk 215 of the first storage area to the available space of the second storage area 260. For example, the backup system can write the data stored in the data chunk 215 into the available storage chunk 265 of the second storage area 260.

In some embodiments, the size of the used space in the first storage area may not be exactly consistent with the size of the available space in the second storage area. The detailed process of the block 306 is described below with reference to FIG. 4, which illustrates a flowchart of a process of moving data in accordance with embodiments of the present disclosure.

Figure 4:
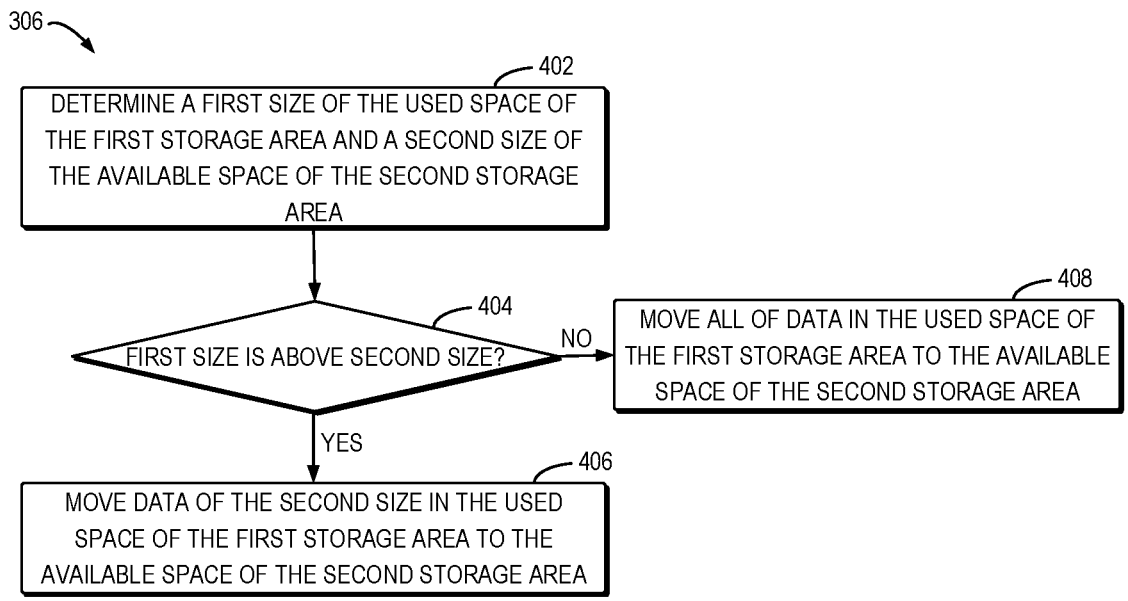
FIG. 4 illustrates a flowchart of a process of moving data in accordance with embodiments of the present disclosure.

As shown in FIG. 4, the backup system can determine, at block 402, a size (hereinafter referred to as "first size" for the sake of description) of the used space in the first storage area and a size (hereinafter referred to as "second size" for the sake of description) of the available space in the second storage area.

At block 404, the backup system can determine whether the first size is greater than the second size. In response to determining that the first size exceeding the second size at block 404, the method proceeds to block 406, i.e., the backup system moves the data of the second size in the used space of the first storage area to the available space of the second storage area. Taking FIG. 2 as the example, when the backup system randomly selects the storage area 230 as the first storage area and the storage area 260 as the second storage area, the first size of the first storage area is 3 storage chunks and the second size of the second storage area is 2 chunks, that is, the first size is greater than the second size. In this case, the backup system can move 2 used data chunks in the first storage area to the second storage area. For example, the backup system can sequentially select the first two storage chunks in the first storage area and move them to the available space in the second storage area.

In response to determining that the first size is less than or equal to the second size at block 404, the method proceeds to block 408, i.e., the backup system moves all data of the used space in the first storage area to the available space of the second storage area. Continue to refer to FIG. 2 as the example. For example, when the backup system selects, according to the size of the available space, the storage area 210 having the maximum available space as the first storage area and selects the storage area 260 having the minimum available space as the second storage area. That is, the first size is 1 data chunk and the second size is 2 data chunks, i.e., the first size is less than the second size. In this case, the backup system can move all data (i.e., data in the storage chunk 215) in the first storage area to the available space in the second storage chunk. For example, the backup system can write the data in the storage chunk 215 into the corresponding storage space of the storage chunk 265.

In some embodiments, before moving at least part of the data in the used space of the first storage area to the available space of the second storage area, the backup system can move the data of the used space in the second storage area, such that the available space in the second storage area is continuous. FIG. 5 illustrates a schematic diagram 500 of a plurality of example storage areas after the movement in accordance with embodiments of the present disclosure. As shown in FIG. 5, in the example where the storage area 210 and the storage area 260 are selected as the first storage area and the second storage area, the backup system can move the used space in the second storage area, such that the available space is located at the rear of the storage space. Therefore, the backup system can improve the efficiency for moving data. For example, as shown in FIG. 5, the data in the storage chunk 215 are written into the storage space corresponding to the free storage chunk 565 after the movement of usage spaces.

In some embodiments, after completing the movement of the at least part of data in the used space of the first storage area to the available space of the second storage area, the backup system can mark the space in the first storage area corresponding to the at least part of data as available. According to FIG. 5, when the movement of data in the storage chunk 215 to the storage chunk 565 is completed, the backup system can mark the space corresponding to the storage chunk 215 as available. That is, the used storage chunk 215 is updated to an available storage chunk 515.

Continue to refer to FIG. 3. At block 308, the backup system determines whether the used space of the first storage area becomes empty after the movement. In response to determining that the used space of the first storage area becomes empty after the movement at block 308, the backup system releases the first storage area. Continue to refer to the example of FIG. 5. After the data in the used storage chunk 215 of the first storage area 210 are moved to the second storage area 260, all spaces in the first storage area 210 are available spaces, and there is therefore no used space.

Through the above solution, embodiments of the present disclosure can release the storage space corresponding to the first storage area 210, which further improves the efficiency of data storage of the backup file. Besides, when the reorganization is implemented by successively choosing the storage areas having maximum and minimum available space by the size of the available space as described above, the backup system can reduce the number of data movements and can more rapidly release the storage area having the maximum available space, which further enhances the efficiency of reclaiming the storage area and improves the data storage efficiency.

In some embodiments, the backup system can simultaneously perform data movement operations between multiple pairs of storage areas in a multi-thread manner. Specifically, when executing the data movement between the first storage area and the second storage area with a first thread, the backup system can move, using a second thread different from the first thread, at least part of data stored in the used space of a third storage area of a plurality of storage areas to the available space of a fourth storage area. Through the parallel movement manner, the backup system can further improve the efficiency of reclaiming the available space.

In some embodiments, as shown in FIG. 3, in response to determining that the available space of the first storage area is not empty after the movement at block 308 or after the releasing of the first storage area is completed at block 310, the method 300 can further proceed to block 312, i.e., the backup system can determine whether the plurality of updated storage areas include at least two storage areas having non-empty available space after the movement. In some embodiments, the backup system can mark the storage areas having no available space as full and the already full storage areas are not to be considered in the next iteration. In response to determining that a plurality of storage areas include a fifth storage area and a sixth storage area having non-empty available space at block 312, the method can return to the block 304 to reorganize the used space in the fifth storage area and the sixth storage area. Specifically, the backup system can move at least part of data in the used space of the fifth storage area to the available space of the sixth storage area.

Figure 5:
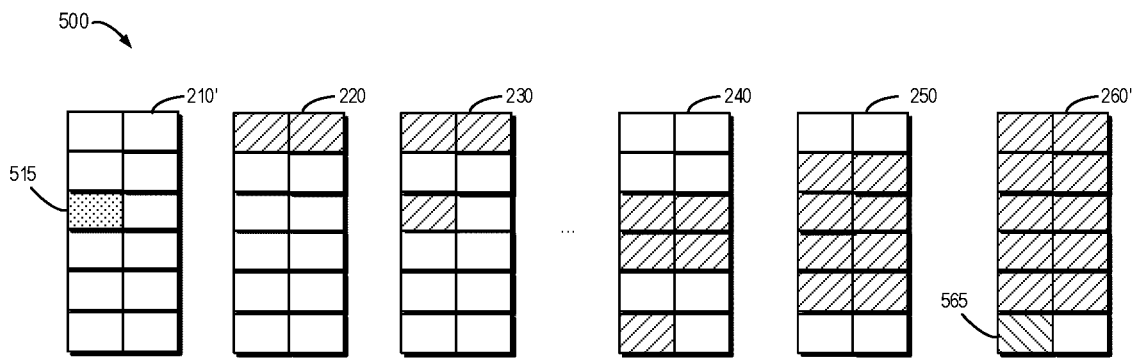
FIG. 5 illustrates a schematic diagram of a plurality of example storage areas after the movement in accordance with embodiments of the present disclosure.

Continue to refer to FIG. 5 as the example. When the first storage area 210' is released, a plurality of storage areas are updated to storage areas 220, 230, 240, 250 and 260'. The backup system can continue to select storage areas having maximum and minimum available space respectively as a new first storage area and a new second storage area, i.e., selecting the storage area 220 (having 10 available storage chunks) as the new first storage area and selecting the updated storage area 260' (having 1 available storage chunk) as the new second storage area. The backup system can continue to execute the steps from block 306 to block 310. That is, the steps shown by block 304 to block 312 in FIG. 3 can be iteratively executed until it is determined, at block 312, that a plurality of storage areas only include at most one storage area with non-empty available space after the movement. Accordingly, embodiments of the present disclosure can arrange and release the available space to the fullest extent, so as to significantly improve the data storage efficiency of the backup file.

In some embodiments, the backup system also can specify a predetermined time for reorganizing the storage area, and ceasing the reorganization when the predetermined time is reached. Accordingly, it is unnecessary for the backup system to execute reorganization until it is determined, at block 312, that a plurality of storage areas only include at most one storage area with non-empty available space after the movement. In such way, the backup system can improve the storage efficiency within a reasonable time.

Figure 6:
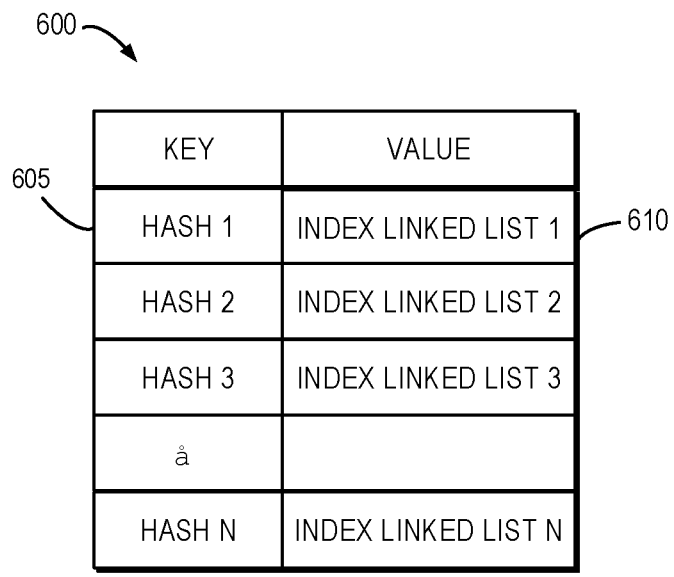
FIG. 6 illustrates a schematic diagram of a hash index table in accordance with embodiments of the present disclosure.

In some embodiments, the backup system can use a hash index table to represent hashes corresponding to the data chunks and the data backup referencing to the data chunk. It should be appreciated that the same data chunk can be referenced by a plurality of backup files on the account of data redundancy of the backup system. FIG. 6 illustrates an example hash index table 600 in accordance with embodiments of the present disclosure. As shown in FIG. 6, key represents a hash 605 of the data chunk while index linked list 610 can represent a plurality of data files referencing to the data chunk corresponding to the hash. Specifically, each node in the index linked list 610 can include information indicating a file referencing to the data chunk, offset in the file, ID of the data chunk and next pointer. In some embodiments, for example, the backup system can update, in the index table 600, storage position information corresponding to the at least part of the data, wherein a data item in the index table indicates an index value associated with the at least part of the data and at least one file referencing to the at least part of the data, thereby indicating the changes in the position of the storage chunk which stores the at least part of the data.

In some embodiments, in a case of a multi-node backup system, after moving at least part of data in the first storage area to the second storage area, the backup system also can update a protection file (e.g., RAIN protection record) corresponding to the part of data correspondingly.

Figure 7:
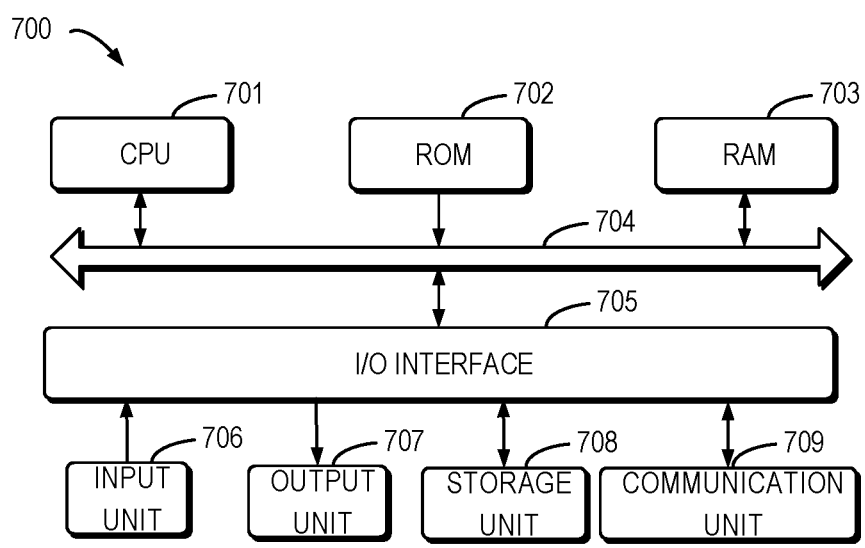
FIG. 7 illustrates a schematic block diagram of an example device for implementing embodiments of the present disclosure.

FIG. 7 shows a schematic block diagram of an example device 700 that can be used to implement embodiments of the present disclosure. For example, the backup system according to embodiments of the present disclosure can be implemented by device 700. As shown, device 700 includes a central processing unit (CPU) 701 that can perform various appropriate actions according to computer program instructions stored in read only memory (ROM) 702 or loaded from storage unit 708 into a random access memory (RAM) 703. In the RAM 703, various programs and data required for the operation of the device 700 can also be stored. The CPU 701, the ROM 702, and the RAM 703 are connected to each other through a bus 704. An input/output (I/O) interface 705 is also coupled to bus 704.

A plurality of components in device 700 are coupled to I/O interface 705, including: input unit 706, such as a keyboard, mouse, etc.; output unit 707, such as various types of displays, speakers, etc.; storage unit 708, such as a disk and an optical unit, etc.; and a communication unit 709 such as a network card, a modem, a wireless communication transceiver, and the like. Communication unit 709 allows device 700 to exchange information/data with other devices over a computer network such as the Internet and/or various telecommunication networks.

The various processes and processes described above, such as method 300, may be performed by processing unit 701. For example, in some embodiments, method 300 can be implemented as a computer software program that is tangibly embodied in a machine readable medium, such as storage unit 708. In some embodiments, some or the entire computer program may be loaded and/or installed onto device 700 via ROM 702 and/or communication unit 709. One or more actions of method 300 described above may be performed when a computer program is loaded into RAM 703 and executed by CPU 701.

The present disclosure can be a method, device, system and/or computer product. The computer product can include a computer readable storage medium with computer readable program instructions for performing various aspects of the present disclosure thereon.

A computer readable storage medium may be a tangible device that can hold and store the instructions used by the instruction execution device. The computer readable storage medium can be, for example, but not limited to, an electrical storage device, a magnetic storage device, an optical storage device, an electromagnetic storage device, a semiconductor storage device, or any suitable combination of the foregoing. More specific examples (non-exhaustive list) of computer readable storage media include: portable computer disks, hard disks, random access memory (RAM), read only memory (ROM), erasable programmable read only memory (EPROM) or flash memory), static random access memory (SRAM), portable compact disk read only memory (CD-ROM), digital versatile disk (DVD), memory stick, floppy disk, mechanical encoding device, for example, the hole card with instructions stored thereon or raised structure in groove, and any suitable combination of the above. The computer readable storage medium as used herein is not to be interpreted as a transient signal itself, such as a radio wave or other freely propagating electromagnetic wave, an electromagnetic wave propagating through a waveguide or other transfer medium (e.g., a light pulse through a fiber optic cable), or the electrical signal transferred through a wire.

The computer readable program instructions described herein can be downloaded from a computer readable storage medium to various computing/processing devices, or downloaded to an external computer or external storage device over a network, such as the Internet, a local area network, a wide area network, and/or a wireless network. The network may include copper transfer cables, fiber optic transfers, wireless transfers, routers, firewalls, switches, gateway computers, and/or edge servers. A network adapter card or a network interface in each computing/processing device receives computer readable program instructions from the network and forwards the computer readable program instructions for storage in a computer readable storage medium in each computing/processing device.

Computer program instructions for performing the operations of the present disclosure may be assembly instructions, instruction set architecture (ISA) instructions, machine instructions, machine related instructions, microcode, firmware instructions, state setting data, source code or object code written or in any combination of one or more programming languages including object oriented programming languages, such as Smalltalk, C++ and so on, as well as conventional procedural programming languages, such as "C" language or similar programming language. The computer readable program instructions can be executed entirely on the user's computer, partly on the user's computer, as a stand-alone software package, partly on the user's computer and partly on the remote computer, or entirely on the remote computer or server. In the case of a remote computer, the remote computer can be connected to the user's computer through any kind of network, including a local area network (LAN) or wide area network (WAN), or can be connected to an external computer (e.g., using an Internet service provider to access the Internet connection). In some embodiments, the customized electronic circuit, such as a programmable logic circuit, a field programmable gate array (FPGA), or a programmable logic array (PLA), can be customized by utilizing state information of computer readable program instructions. The electronic circuit can execute computer readable program instructions to implement various aspects of the present disclosure.

Various aspects of the disclosure are described herein with reference to flowcharts and/or block diagrams of methods, devices (systems) and computer products according to embodiments of the present disclosure. It will be understood that each block of the flowchart illustrations and/or block diagrams, and combinations of blocks in the flowcharts and/or block diagrams can be implemented by computer readable program instructions.

These computer readable program instructions can be provided to a processing unit of a general purpose computer, a special purpose computer or other programmable data processing apparatus to produce a machine such that when the instructions are executed by processing unit via a computer or other programmable data processing apparatus, devices that implement the functions/acts specified in one or more of the flowcharts and/or block diagrams are produced. The computer readable program instructions can also be stored in a computer readable storage medium that causes the computer, programmable data processing device, and/or other device to operate in a particular manner, such that the computer readable medium storing the instructions includes an article of manufacture that includes instructions for implementing various aspects of the functions/acts recited in one or more blocks of the flowcharts and/or block diagrams.

Computer readable program instructions can also be loaded onto a computer, other programmable data processing device, or other device to perform a series of operational steps on a computer, other programmable data processing device or other device to produce a process that a computer is implemented such that instructions executed on a computer, other programmable data processing apparatus, or other device implement the functions/acts recited in one or more of the flowcharts and/or block diagrams.

The flowchart and block diagrams in the drawings illustrate the architecture, functionality, and operation of possible implementations of devices, methods, and computer products according to various embodiments of the present disclosure. In this regard, each block in the flowchart or block diagram can represent a module, a program segment, or a portion of an instruction, module, the program segment, or a portion of the instruction includes one or more executable instructions for implementing principles. In some alternative implementations, the functions noted in the blocks may also occur in a different order than those illustrated in the drawings. For example, two consecutive blocks may be executed substantially in parallel, and they may sometimes be executed in a reverse order, depending upon the functionality involved. It is also noted that each block of the block diagrams and/or flowcharts, and combinations of blocks in the block diagrams and/or flowcharts, can be implemented in a dedicated hardware-based system that performs the specified function or action of principle or can be implemented with a combination of dedicated hardware and computer instructions.

The embodiments of the present disclosure have been described above, and the foregoing description is illustrative, not limiting, and not limited to the disclosed embodiments. Numerous modifications and changes will be apparent to those skilled in the art without departing from the scope of the invention. The choice of terms used herein is intended to best explain the principles, practical applications, or technical improvements of the techniques on the market, or enable other ordinary technical staffs in the art to understand the embodiments in the disclosure.

We claim:

1. A method for backup storage management, comprising:
allocating, by a processor coupled to a backup storage system, a fixed size for each file of a plurality of files associated with backup data, wherein a plurality of data chunks comprises the plurality of files and are stored in a plurality of storage areas of the backup storage system;
selecting, by the processor, a first storage area and a second storage area from the plurality of storage areas, the second storage area comprising one or more storage chunks corresponding to available storage space;
moving, by the processor, one or more data chunks stored in the first storage area to the available storage space of the second storage area to create a continuous storage space in the first storage area, wherein the available storage space comprises at least one of empty storage chunks, expired non-empty storage chunks, or marked for deletion non-empty storage chunks; and
releasing, by the processor, the continuous storage space in the first storage area.

2. The method of claim 1, wherein the first storage area has maximum available space in the plurality of storage areas and the second storage area has minimum non-zero available space.

3. The method of claim 1, further comprising:
while executing the moving with a first thread of the processor, moving, using a second thread of the processor different from the first thread, at least part of data stored in used space of a third storage area of the plurality of storage areas to available space of a fourth storage area.

4. The method of claim 1, further comprising:
determining, by the processor, whether the plurality of storage areas include at least two storage areas having non-empty available space after the moving; and
in response to determining that the plurality of storage areas include a fifth storage area and a sixth storage area having non-empty available space, moving, by the processor, at least part of data in used space of the fifth storage area to the available space of the sixth storage area.

5. The method of claim 1, wherein the moving, by the processor, further comprises:
   determining a first size of used space of the first storage area and a second size of the available space of the second storage area;
   in response to the first size being less than or equal to the second size, moving all the data chunks in the used space of the first storage area to the available space of the second storage area; and
   in response to the first size exceeding the second size, moving the data chunks of the second size in the used space of the first storage area to the available space of the second storage area.

6. The method of claim 1, wherein the moving, by the processor, further comprises:
   marking space in the first storage area corresponding to the one or more data chunks as available.

7. The method of claim 1, further comprising:
   indicating a change in a position of the one or more storage chunks by updating, by the processor, storage position information in an index table corresponding to the one or more data chunks, wherein a data item in the index table indicates an index value associated with the at least part of the data of the one or more data chunks and at least one file referencing to the at least part the data.

8. The method of claim 1, wherein the plurality of files are backup files.

9. A device for storage management, comprising:
   a processor; and
   at least one memory being coupled to the processor and storing instructions for execution by the processor, the instructions, when executed by the processor, cause the processor to perform operations, the operations comprising:
      allocating, by the processor coupled to a backup storage system, a fixed size for each file of a plurality of files associated with backup data, wherein a plurality of data chunks comprises the plurality of files and are stored in a plurality of storage areas of the backup storage system;
      selecting, from the plurality of storage areas, a first storage area and second storage area, the second storage area comprising one or more storage chunks corresponding to available storage space;
      moving one or more data chunks stored in the first storage area to the available space of the second storage area to create a continuous storage space in the first storage area, wherein the available storage space comprises at least one of empty storage chunks, expired non-empty storage chunks, or marked for deletion non-empty storage chunks; and
      releasing the continuous storage space in the first storage area.

10. The device of claim 9, wherein the first storage area has maximum available space in the plurality of storage areas and the second storage area has minimum non- zero available space.

11. The device of claim 9, wherein the operations further comprise:
   while executing the moving with a first thread of the processor, moving, using a second thread of the processor different from the first thread, at least part of data stored in used space of a third storage area of the plurality of storage areas to available space of a fourth storage area.

12. The device of claim 9, wherein the operations further comprise:
   determining whether the plurality of storage areas include at least two storage areas having non-empty available space after the moving; and
   in response to determining that the plurality of storage areas include a fifth storage area and a sixth storage area having non-empty available space, moving at least part of data in used space of the fifth storage area to the available space of the sixth storage area.

13. The device of claim 9, wherein the moving operation comprises:
   determining a first size of used space of the first storage area and a second size of the available space of the second storage area;
   in response to the first size being less than or equal to the second size, moving all of data in the used space of the first storage area to the available space of the second storage area; and
   in response to the first size exceeding the second size, moving data of the second size in the used space of the first storage area to the available space of the second storage area.

14. The device of claim 9, wherein the moving operation comprises:
   moving data of used space in the second storage area, such that the available space in the second storage area is continuous.

15. The device of claim 9, wherein the moving operation comprises:
   marking space in the first storage area corresponding to the the data as available.

16. The device of claim 9, wherein the operations further comprise:
   indicating a change in a position of the one or more storage chunks by updating, in an index table, storage position information corresponding to the the one or more data chunks, a data item in the index table indicating an index value associated with at least part of the data of the one or more data chunks and at least one file referencing to the at least part the data.

17. The device of claim 9, wherein the plurality of files are backup files.

18. A non-transitory machine-readable medium having instructions stored therein, which when executed by a processor, cause the processor to perform operations, the operations comprising:
   allocating, by the processor coupled to a backup storage system, a fixed size for each file of a plurality of files associated with backup data, wherein a plurality of data chunks comprises the plurality of files and are stored in a plurality of storage areas of the backup storage system;
   selecting, from the plurality of storage areas, a first storage area and second storage area, the second storage area comprising one or more storage chunks corresponding to available storage space;
   moving one or more data chunks stored in the first storage area to the available space of the second storage area to create a continuous storage space in the first storage area, wherein the available storage space comprises at least one of empty storage chunks, expired non-empty storage chunks, or marked for deletion non-empty storage chunks; and
   releasing the continuous storage space in the first storage area.

19. The non-transitory machine-readable medium of claim 9, wherein the operations further comprise:
- determining a first size of used space of the first storage area and a second size of the available space of the second storage area;
- in response to the first size being less than or equal to the second size, moving all of data in the used space of the first storage area to the available space of the second storage area; and
- in response to the first size exceeding the second size, moving data of the second size in the used space of the first storage area to the available space of the second storage area.

20. The method of claim 1, further comprising:
- determining an amount of data of the plurality of data chunks stored in the plurality of storage areas is at least one of expired or marked for deletion and exceeds a threshold value; and
- initiating a reorganization of the plurality of data chunks within each of the plurality of storage areas.

* * * * *